United States Patent [19]

Matsubayashi et al.

[11] Patent Number: 5,404,490
[45] Date of Patent: Apr. 4, 1995

[54] PHOTOMAGNETIC SIGNAL DETECTING DEVICE

[75] Inventors: Nobuhide Matsubayashi; Yoichi Hosaka; Ken Sugawara, all of Hachioji, Japan

[73] Assignee: Olympus Optical Co., Ltd., Tokyo, Japan

[21] Appl. No.: 918,776

[22] Filed: Jul. 27, 1992

Related U.S. Application Data

[63] Continuation of Ser. No. 506,483, Apr. 6, 1990, abandoned, which is a continuation of Ser. No. 149,028, Jan. 27, 1988, abandoned.

[30] Foreign Application Priority Data

Jan. 28, 1987 [JP] Japan .................................. 62-17983
Oct. 13, 1987 [JP] Japan ............................ 62-156952 U

[51] Int. Cl.6 ............................ G02B 5/30; G11B 7/00
[52] U.S. Cl. .................................... 359/487; 359/494; 359/495; 369/110; 369/112; 369/116; 250/201.5; 250/208.2
[58] Field of Search ............... 350/403, 401, 377, 376, 350/375, 434, 402, 286; 250/201, 205, 201.5, 208.2; 369/13, 45, 110, 44.14, 112, 116; 359/487, 494, 495, 496, 497

[56] References Cited

U.S. PATENT DOCUMENTS

| | | | |
|---|---|---|---|
| 3,501,640 | 3/1970 | Harris | 350/403 |
| 4,429,378 | 1/1984 | Sato | 350/402 |
| 4,464,741 | 8/1984 | Compaan | 369/112 |
| 4,505,584 | 3/1985 | Kato et al. | 369/44.14 |
| 4,562,345 | 12/1985 | Aoki et al. | 250/204 |
| 4,566,761 | 1/1986 | Carlsen et al. | 350/401 |
| 4,644,516 | 2/1987 | Musha | 369/45 |
| 4,682,311 | 7/1987 | Matsubayashi et al. | 350/401 |
| 4,716,284 | 12/1987 | Tanaka | 354/403 |
| 4,721,368 | 1/1988 | DeGuchi et al. | 350/377 |
| 4,730,899 | 3/1988 | Kime et al. | 369/44.14 |
| 4,742,218 | 5/1988 | Nakamura et al. | 250/201.5 |
| 4,779,250 | 10/1988 | Kogure et al. | 369/13 |
| 4,785,438 | 11/1988 | Mizunoe | 369/110 |
| 4,801,794 | 1/1989 | Kowalski | 250/201.5 |
| 4,853,923 | 8/1989 | Yamada et al. | 369/110 |

FOREIGN PATENT DOCUMENTS

| | | | |
|---|---|---|---|
| 0078673 | 5/1983 | European Pat. Off. | 369/13 |
| 59-191156 | 10/1984 | Japan . | |
| 0053928 | 3/1985 | Japan | 350/402 |
| 60-113347 | 6/1985 | Japan . | |
| 60-182537 | 9/1985 | Japan . | |
| 0206944 | 9/1986 | Japan | 369/110 |
| 2072877 | 10/1981 | United Kingdom | 350/394 |

OTHER PUBLICATIONS

Halliday; "Fundamentals of Physics"; 2nd Edition Copyright 1970, 1974 and 1981 by John Wiley & Sons, Inc. pp. 693–694.

Primary Examiner—Ricky D. Shafer
Attorney, Agent, or Firm—Armstrong, Westerman, Hattori, McLeland & Naughton

[57] ABSTRACT

A photomagnetic signal detecting apparatus, in the reflected light path of a light beam reflected from a recording medium in which information is magnetically recorded, there is provided an optical element having a light beam dividing device transmitting one of two polarized lights intersecting at right angles with each other and reflecting the other polarized light and a light path converting device emitting by reflection or refraction the light beam reflected by this light beam dividing device in substantially the same direction as of the transmitted light transmitted through the above mentioned light beam dividing device so that the transmitted light and reflected light emitted from this optical element may be received by a photodetecting device.

7 Claims, 9 Drawing Sheets

PRIOR ART

FIG.19

PHOTOMAGNETIC SIGNAL DETECTING DEVICE

This application is a continuation of application Ser. No. 506,483, filed Apr. 6, 1990, now abandoned, which is a continuation of application Ser. No. 149,029, filed Jan. 27, 1988, now abandoned.

FIELD OF THE INVENTION

This invention relates to a photomagnetic signal detecting apparatus wherein a polarized light is radiated onto a magnetic recording medium surface having recorded information and the rotation of the polarization plane by the magnetic Kerr effect of the reflected light is optically read out to detect information.

BACKGROUND OF THE INVENTION

Various optical systems forming photomagnetic signal detecting apparatus have been already suggested. For example, in the specification of a Japanese patent laid open No. 191156/1984, in an optical system wherein a reflected polarized light from a magnetic optical recording medium is led to a beam splitter and the transmitted light or reflected light by this beam splitter is divided into two components intersecting at right angles with each other by a polarizing beam splitter and is then received by a detector, a rotator is provided between the beam splitter and the polarizing beam splitter to easily adjust the polarization plane of the polarized light entering the polarizing beam splitter.

Also, in the specification of a Japanese patent laid open No. 113347/1985 a beam splitter is provided in a light path and is multilayer-coated on the reflecting surface with a dielectric film with optical characteristics having a relationship relation of $T_P > T_S$ between the amplitude transmissivity $T_P$ for a P polarized light and the amplitude transmissivity $T_S$ for an S polarized light and a phase difference of $n\pi - \pi/4 \leq \delta \leq \pi + \pi/4$ (wherein n is an integer) between the transmitted P wave and S wave to increase the magnetic optical rotation angle and to make reproduction easy.

Further, in the specification of a Japanese patent laid open No. 182537/1985, there is disclosed a technique whereby a polarizing beam splitter is provided rotatably with respect to the optical axis and a differential amplifier, detecting and differentially amplifying the two separate lights emitted from this polarizing beam splitter, is provided so that the variation of the polarization plane of the polarizing beam splitter may be detected.

Figure 14:
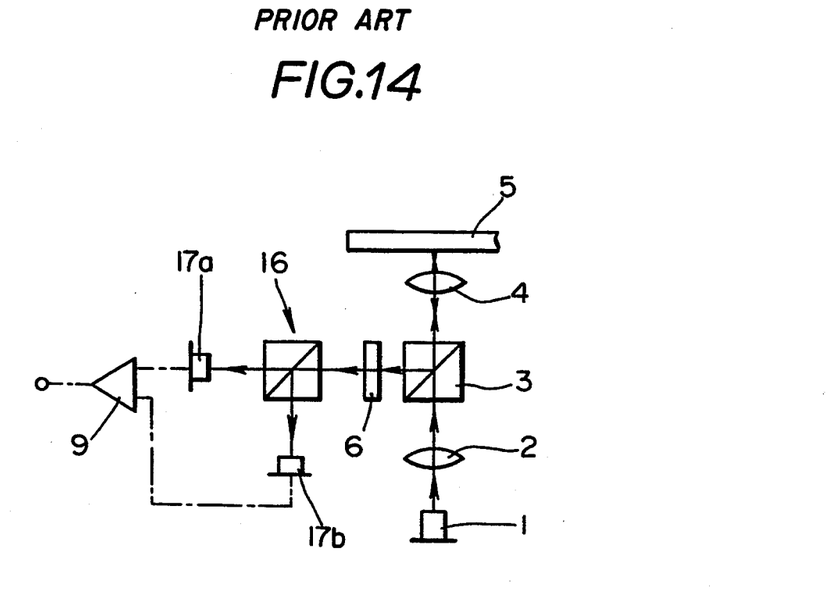
FIG. 14 is an explanatory view showing a fundamental formation of a photomagnetic signal detecting apparatus.
Figure 15:
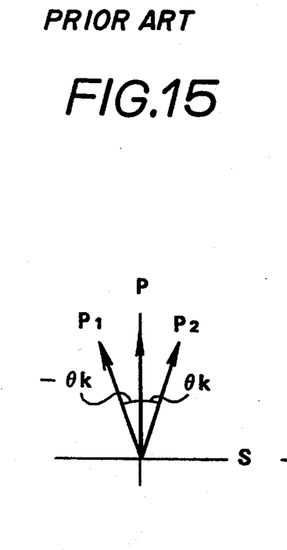
FIG. 15 is an explanatory view of a Kerr rotated light vector.
Figure 16:
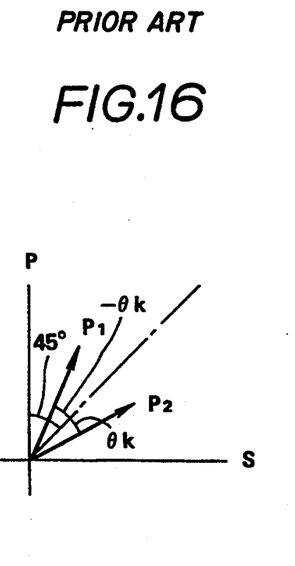
FIG. 16 is an explanatory view of a light vector rotated by 45 degrees.
Figure 17:
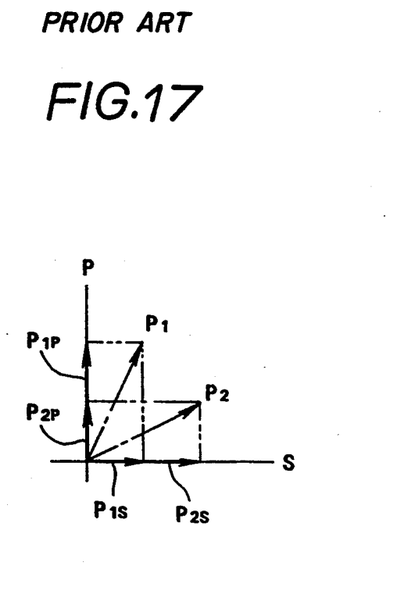
FIG. 17 is an explanatory view of a light vector divided by a PBS.
Figures 18A, 18B:
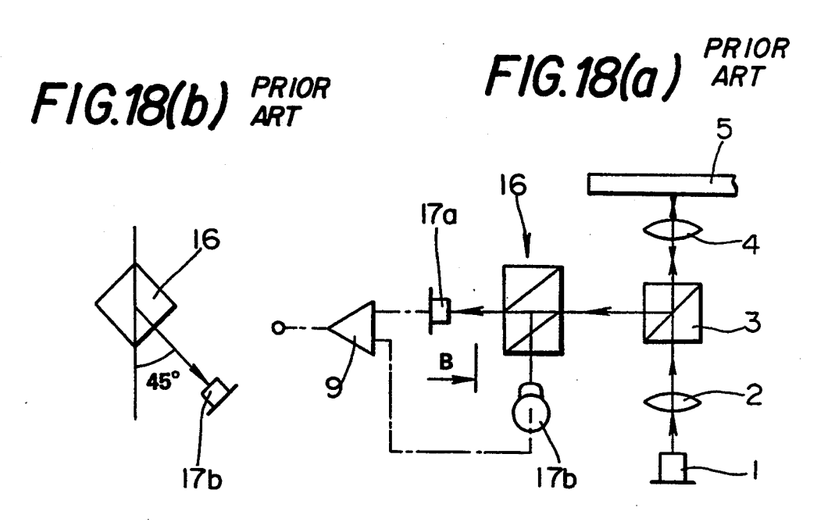

A conventional photomagnetic signal detecting apparatus shall be explained with reference to FIGS. 14 to 19. FIGS. 14, 18 (a) and (b) and 19 are explanatory views showing schematic fundamental formations. FIGS. 15, 16 and 17 are views explaining light vectors.

In FIG. 14, for example, a P-polarized light beam having come out of a laser light source 1 is made into a parallel light beam by a collimator lens 2, passes through a beam splitter 3 and is radiated by an objective lens 4 onto a recording medium surface 5. Depending a whether the magnetizing direction of the recording medium surface 5 is upward or downward, the reflected light by the recording medium surface 5 is subjected to a Kerr rotation $\theta k$ or $-\theta k$ to be a light vector $P_1$ or $P_2$ as in FIG. 15.

The reflected light by the recording medium surface 5 passes through the objective 4, is reflected by the beam splitter 3 and enters a ½-wavelength plate 6.

In the ½-wavelength plate, in order that the light amounts of the divided transmitted light and the reflected light by a later described polarizing beam splitter (abbreviated as the PBS hereinafter) 16 may be substantially equal to each other, the polarization plane of the light entering the PBS 16 is rotated by 45 degrees with respect to the polarization plane before the incident light is subjected to the Kerr rotation as in FIG. 16. In order to rotate the polarization plane by 45 degrees, the orientation angle $\Phi$ made by the main axis of the ½-wavelength plate 6 and the polarization plane of the incident light is set at 22.5 degrees. If the adjusting error of this orientation angle $\Phi$ is $\alpha$, the actual orientation angle will be set at $\Phi$ 22.5°$\pm\alpha$, the polarized light plane will rotate by 45°$\pm 2\alpha$ and the error will be twice as large. Therefore, the operation of setting the orientation angle at 22.5 degrees requires high precision.

The light beam having passed through the ½-wavelength plate 6 and having had the polarization plane rotated by 45 degrees enters the PBS 16. As the PBS 16 transmits a P polarized light and reflects an S polarized light, as in FIG. 17, the transmitted light will be only P components ($P_{1P}$ and $P_{2P}$) and the reflected light will only be S components ($P_{1S}$ and $P_{2S}$). The components $P_{1P}$, $P_{2P}$ and $P_{1S}$, $P_{2S}$ divided by the PBS 16 are received respectively by photodetectors 17a and 17b and are converted to electric signals. The intensity of this electric signal will be high at the time of $P_{1P}$ but will be low at the time of $P_{1S}$ on the photodetector 17a and will be low at the time of $P_{1S}$ but will be high at the time of $P_{2S}$ on the photodetector 17b. Therefore, if the difference between the photodetectors 17a and 17b is taken by a differential amplifier 9, an information signal discriminating $P_1$ and $P_2$ from each other will be able to be extracted.

FIGS. 18 (a) and 18 (b) are explanatory views when the PBS 16 is rotated by 45 degrees, without using the ½-wavelength plate 6, to have the same effect as having passed through the ½-wavelength plate 6. FIG. 18 (b) is a sectioned view as seen in the direction of the arrow B in FIG. 18 (a). In this case, the plane formed by the two divided lights emitted from the PBS 16 and the paper surface of FIGS. 18 (a) form an angle of 45 degrees and photodetectors 17a and 17b also must be arranged in the plane formed by the two divided lights. Now, generally, in view of the optical axis adjustment, metal working and assembly, it is not easy and is preferable to be avoided to arrange an optical member at other intermediate odd angles than 0, 90, 180, 270 and 360 degrees.

Figure 19:
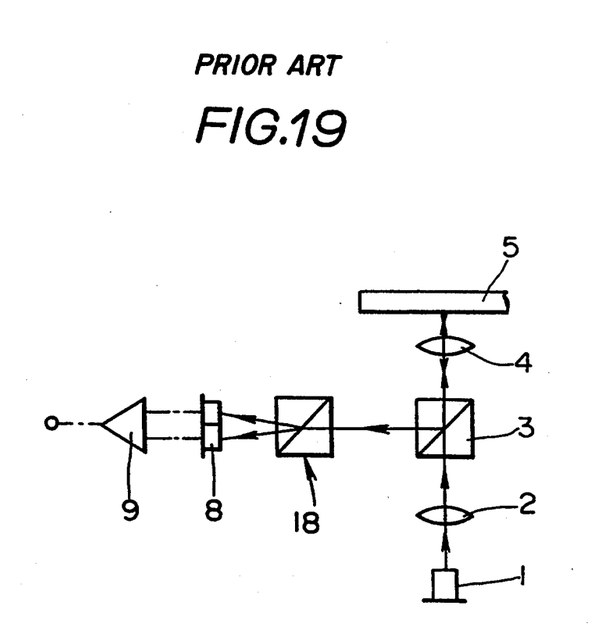
FIG. 19 is an explanatory view showing the fundamental formation of a photomagnetic signal detecting apparatus relating to the third embodiment.

FIG. 19 is an explanatory view when a Wollaston polarizing prism 18 is used instead of the ½-wavelength plate 6 and PBS 16. Instead of rotating the polarization plane by 45 degrees with the ½-wavelength plate 6, the Wollaston polarizing prism 18 is rotated by 45 degrees so that the normal light and abnormal light having passed through the Wollaston polarizing prism may be substantially of the same light amount and the separated lights are received by a two-divided photodiode 8. In this system, even though the Wollaston polarizing prism 18 is rotated by 45 degrees, as the separating angle of the divided polarized lights is small, the form of the optical system will not be complicated and, as the two-divided photodiode 8 is used, the number of parts is low. However, there are defects that the Wollaston polarizing prism 18 is much more expensive than the PBS 16 and the separating angle of the two polarized lights is so small that, in order to perfectly separate the polarized light, the light path must be taken to be large and the optical system becomes large.

OBJECT AND SUMMARY OF THE INVENTION

An object of the present invention is to simplify the angular adjustment of the polarization plane of a light beam entering a polarizing beam splitter, to reduce the number of parts forming the optical system, to simplify the formation of the optical system and to reduce the present invention will become apparent with the following explanation.

BRIEF DESCRIPTION OF THE DRAWINGS

FIGS. 1 and 2 relate to the first embodiment of the present invention.

FIGS. 3 (a) and 3 (b) relate to the second embodiment of the present invention.

FIG. 3 (a) is an explanatory view showing the schematic fundamental formation of a photomagnetic signal detecting apparatus.

FIG. 3 (b) is a sectioned view as seen in the direction of the arrow A in FIG. 3 (a).

FIGS. 4 (a) to 4 (d) relate to modifications of a PBS.

FIG. 4 (a) is a formation view of a PBS formed of three prisms of the same shape.

FIG. 4 (b) is a formation view of a PBS formed by prisms having triangular and parallelogramic cross-section.

FIG. 4 (c) is a formation view of a PBS in which the P polarized light and S polarized light are not parallel with each other.

FIG. 4 (d) is a formation view of a PBS in which the S polarized light is bent by refraction.

FIGS. 7 to 9 relate to the fifth embodiment of the present invention.

FIGS. 10 to 13 relate to this sixth embodiment of the present invention.

FIGS. 14 to 17 relate to the first prior art example.

FIGS. 18 (a) and 18 (b) relate to the second prior art example.

FIG. 18 (a) is an explanatory view showing the fundamental formation of a conventional photomagnetic signal detecting apparatus.

FIG. 18 (b) is a sectioned view as seen in the direction of the arrow B in FIG. 18 (a).

DETAILED DESCRIPTION OF PREFERRED EMBODIMENTS

Figure 1:
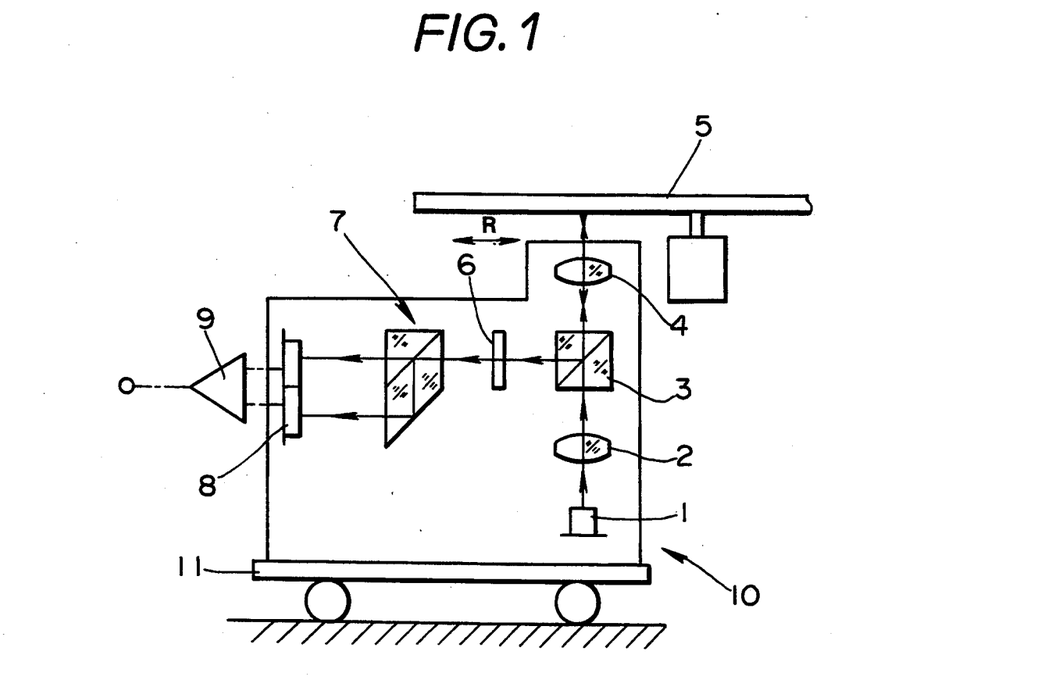
FIG. 1 is an explanatory view showing the schematic fundamental formation of a photomagnetic signal detecting apparatus.
Figure 2:
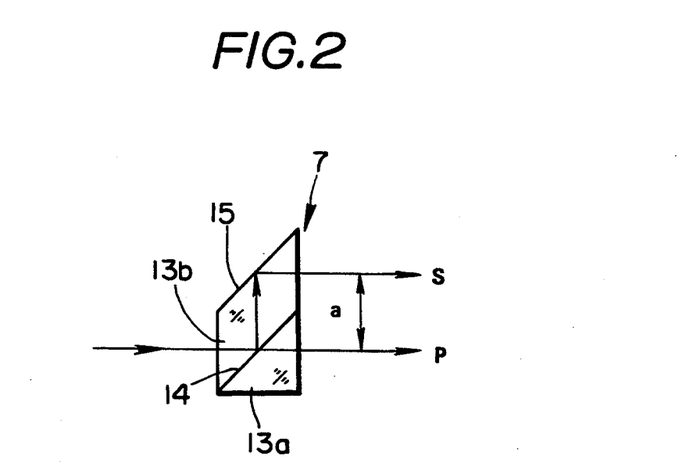
FIG. 2 a formation explaining view of a PBS (polarizing beam splitter).

The embodiments of the present invention shall be explained in the following with reference to the drawings. FIGS. 1 and 2 show the first embodiment of the present invention.

As shown in FIG. 1, a photomagnetic signal detecting apparatus 10 is arranged as opposed to one surface of a recording medium surface 5. Within the photomagnetic signal detecting apparatus 10, a laser light source 1 is contained and a collimator lens 2, beam splitter 3 and objective lens 4 are coaxially arranged in the center of the light path of this laser light source 1.

A ½-wavelength plate 6 as a rotator is located, for example, in a reflected light path forming an angle of 90 degrees with the light path of the laser light source 1 so that the light beam having passed through it may enter a PBS 7 as an optical element.

In the above mentioned PBS 7, in FIG. 2, one of optical media 13a and 13b, for example, of glass or the like is made a triangular prism having a right triangle as a cross-section, the other is made a quadrilateral prism having a parallelogram as a cross-section and a dielectric film 14 as a light beam dividing means is formed on the surfaces in contact with each other to make them integral.

The P polarized light of the light entering the PBS 7 passes all through the dielectric film 14 and advances in the same direction as of the incident light but, on the other hand, the S polarized light is reflected by the dielectric film 14 and then reaches a reflecting surface 15 formed of the optical medium 13b as a light path converting means and having an angle, for example, of 45 degrees with the incident light. Now, if the refractive index n of the optical medium 13b is n−1.5, as the angle of incidence upon the reflecting surface 15 is larger than the critical angle, all the light will be reflected to obtain a reflected light in a position in the same direction as the incident light and parallelly shifted by a distance.

For example, a two-divided photodiode 8 is arranged in the light paths of the transmitted light and reflected light by the above mentioned PBS 7 to convert the transmitted light and reflected light to electric signals. The two-divided photodiode 8 is electrically connected to a differential amplifier 9 so that the intensities of the transmitted light and reflected light may be extracted as electric signals.

The photomagnetic signal detecting apparatus 10 is made movable in the radial direction R of the recording medium surface 5 by a voice coil motor, not illustrated, fitted to a carriage 11.

The operation of the first embodiment shall be explained with reference to FIG. 1.

For example, the light beam of a P polarized light from the laser light source 1 is made parallel by the collimator lens 2, then passes through the beam splitter 3 and is radiated onto the recording medium surface 5 by the objective 4.

The reflected light by the above mentioned recording medium surface 5 is subjected to a Kerr rotation $\theta k$ or $-\theta K$ depending on whether the magnification of the recording medium surface 5 is upward or downward so as to be a light vector $P_1$ or $P_2$ having an S component as shown in FIG. 15.

The above mentioned reflected light passes again through the objective 4 and enters the beam splitter 3. The incident light from the recording medium surface 5 is reflected by the beam splitter 3 onto the ½-wavelength plate 6. Here, by setting at 22.5 degrees the orientation angle of the ½-wavelength plate 6, the polarization plane of the incident light upon the ½-wavelength plate 6 is rotated by 45 degrees in transmitting the light. As a result, the polarized light ($P_1$ or $P_2$) having passed through the ½-wavelength plate 6 enters the PBS 7 as rotated by 45 degrees (by $45°+\theta k$ or $45°-\theta k$ as from the original P polarization plane) as shown in FIG. 16.

The PBS 7 is provided by integrating the prisms dividing the incident light into a transmitted light and reflected light and reflecting the reflected light in parallel with the transmitted light.

As in FIG. 17, the transmitted light through the PBS 7 becomes only a P component ($P_{1P}$ or $P_{2P}$) and the reflected light becomes only an S component ($P_{1S}$ or $P_{2S}$). By shortening the distance a between the transmitted light and reflected light in FIG. 2, these polarized lights are received by the two-divided photodiode 8 and are converted to electric signals. By the differential amplifier 9 electrically connected with the two-divided photodiode 8, the difference in the intensity between the above mentioned electric signal is taken, $P_1$ and $P_2$ are discriminated and thereby an information signal is extracted.

In this embodiment, as the P polarized light and S polarized light from the PBS 7 are parallel light keeping a fixed distance between them, the two polarized lights can be received by one two-divided photodiode 8 and therefore the number of parts can be reduced.

Figures 3A, 3B:
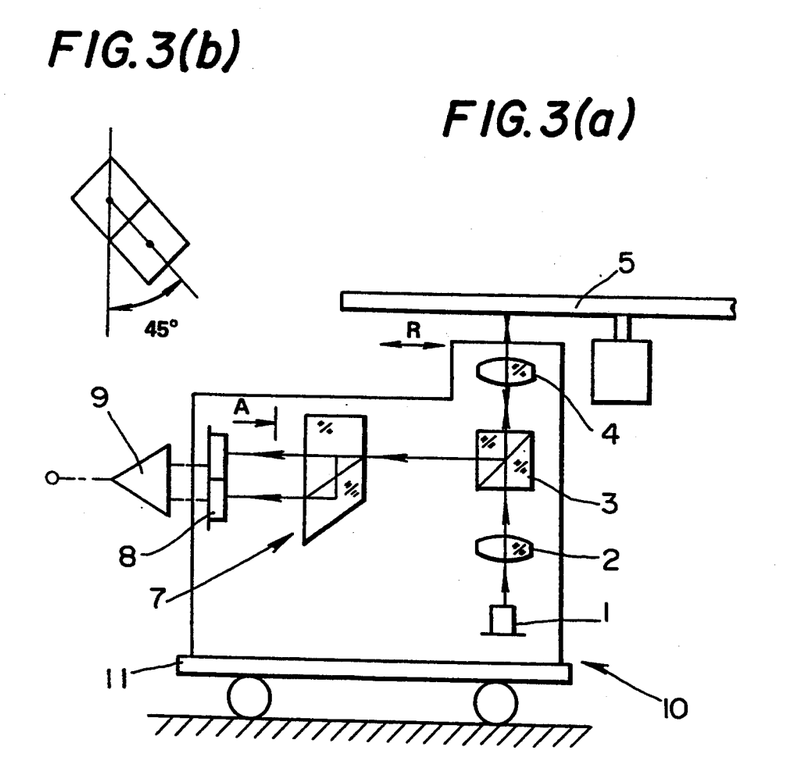

FIGS. 3 (a) and 3 (b) show the second embodiment.

The second embodiment is the same as the first embodiment except that the ½-wavelength plate 6 is not used and the PBS 7 is rotated by 45 degrees with respect to the polarized light before the incident light is subjected to a Kerr rotation.

In FIG. 3 (a), the reflected light from the beam splitter 3 enters the PBS 7. In order to make the light amounts of the P polarized light and S polarized light substantially equal to each other, the PBS 7 is arranged with the main axis rotated by 45 degrees with respect to the polarization plane of the incident light as in FIG. 3 (b). The transmitted light and reflected light by the PBS 7 are parallel with each other and can be received by the two-divided photodiode 8 by shortening the distance a between them.

In this embodiment, since the ½-wavelength plate 6 is not used, the precision of the set angle of the polarization angle can be elevated and therefore the adjusting operation can be reduced. Compared with the conventional method wherein the PBS 16 is rotated by 45 degrees, Since the transmitted light and reflected light by the PBS 7 in the present invention are parallel with each other, the two photodetectors 17a and 17b can be replaced with one two-divided photodiode 8, the number of parts is reduced and the form of the optical system is simplified.

The other formations and operation are the same as in the first embodiment.

FIGS. 4 (a), 4(b), 4(c) and 4(d) show modifications of the PBS 7.

Figure 4A:
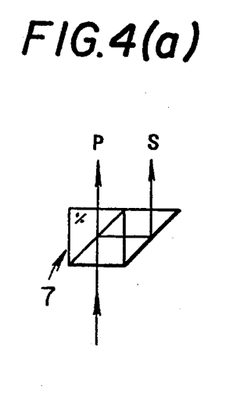
Figure 4B:
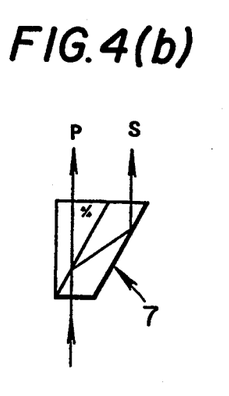
Figure 4C:
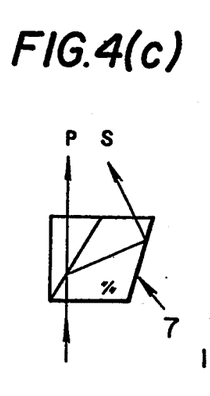
Figure 4D:
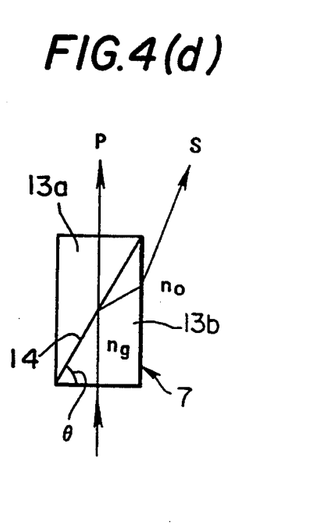

FIG. 4 (a) shows a formation by pasting together three prisms having the same isosceles triangular cross-section. FIG. 4 (b) shows a formation by combining a right triangle having other angles than 45 degrees and a parallelogram. FIG. 4 shows a formation in which the P polarized light and S polarized light are not parallel with each other. FIG. 4 (d) shows a PBS 7 formed by pasting on the hypotenuse of each other the optical media 13a and 13b as triangular prisms each having a cross-section of a right triangle having an angle $\theta$. If the refractive index of the optical media 13a and 13b is represented by ng and the refractive index of air is represented by no, the angle $\theta$ will be represented by the following formula:

$$45° < \theta < 90° - (\sin^{-1}(no/ng))/2$$

By such a formation, for the incident light upon the PBS 7, the S polarized light reflected by the dielectric film 14 will be refracted when it is emitted out of the medium 13b and will have the optical axis bent toward the emitting direction of the P polarized light passing through the dielectric film 14. By thus decreasing the reflecting surfaces, the ground surface can be decreased.

The other formations and operations are the same as in the first embodiment.

Figure 5:
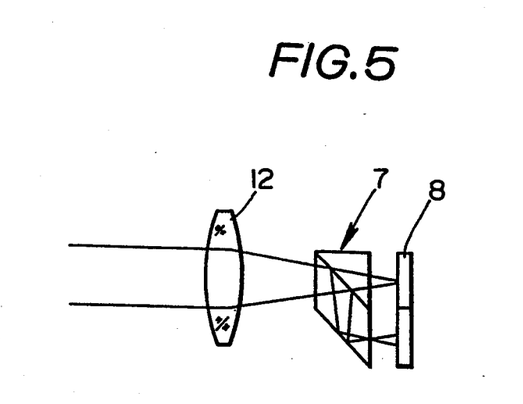
FIG. 5 relates to the third embodiment of the present invention and is a formation view of an optical system using a convex lens.

FIG. 5 shows the third embodiment of the present invention.

In this embodiment, a convex lens 12 is provided between the beam splitter 3 and polarizing beam splitter 7. By such a formation, the light beam emitted from the beam splitter 3 is condensed. This condensed light beam is incident upon the polarizing beam splitter 7. The transmitted light and reflected light by the polarizing beam splitter are further condensed and are incident upon the two-divided photodiode 8. As the light beams incident upon the two-divided photodiode 8 are condensed, the light receiving surface can be made smaller and the two-divided photodiode 8 can be made smaller.

Figure 6:
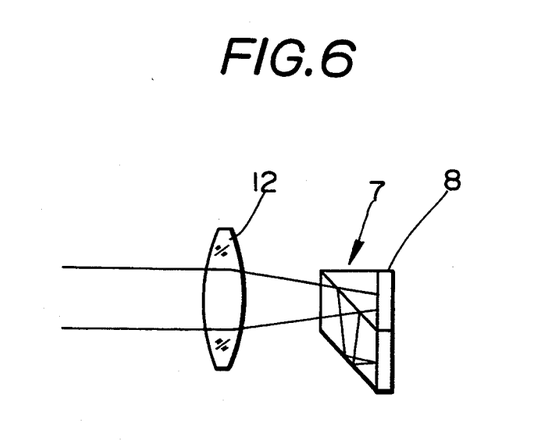
FIG. 6 relates to the fourth embodiment of the present invention and is a formation view of an optical system in which a two-divided photodiode is made integral with a polarizing beam splitter.

FIG. 6 shows the fourth embodiment of the present invention.

In this embodiment, the two-divided photodiode 8 is bonded and fixed on the exit surface side of the polarizing beam splitter 7 of the third embodiment. By such a formation, the rotating directions of the polarizing beam splitter and two-divided photodiode can be simultaneously adjusted and the two-divided photodiode need not be positioned.

The other formations and operations are the same as in the first embodimention.

Figure 7:
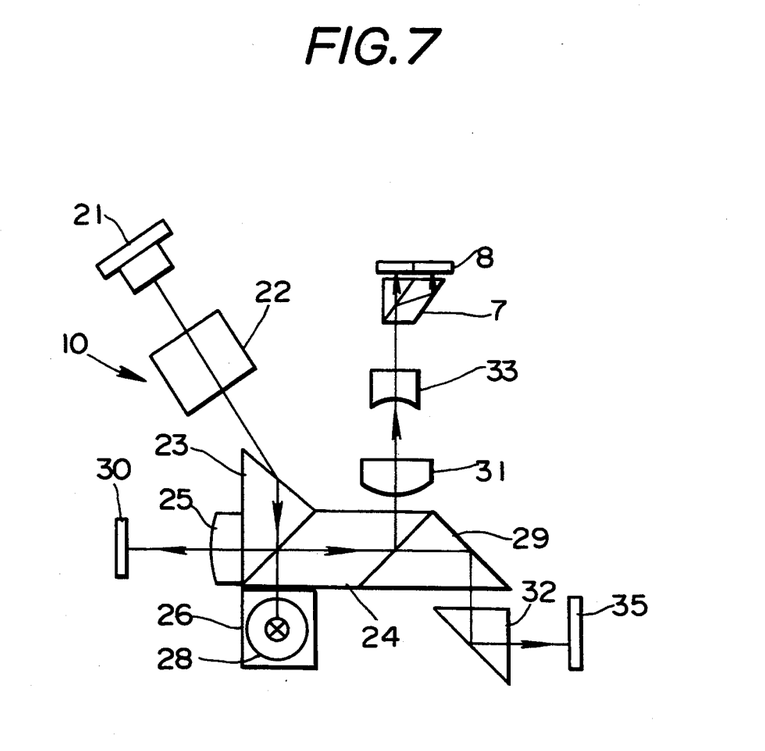
FIG. 7 is a formation explaining view of an optical system of a photomagnetic signal detecting apparatus.
Figure 8:
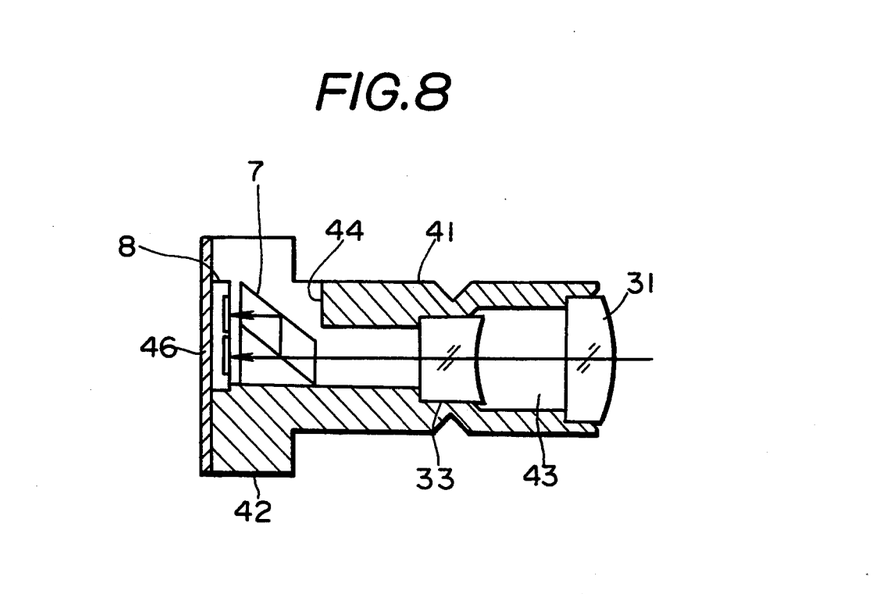
FIG. 8 is a formation explaining view of a lens frame.
Figure 9:
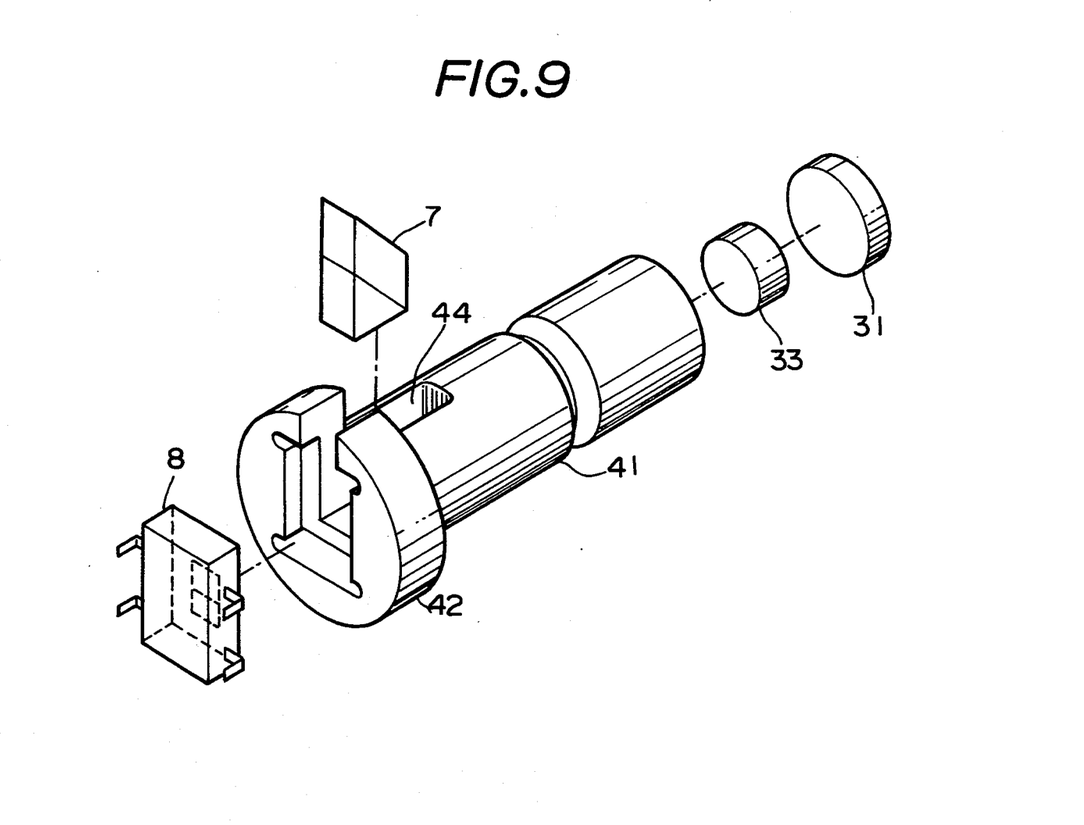
FIG. 9 is a disassembled perspective view of a lens frame.

FIGS. 7 to 9 show the fifth embodiment of the present invention.

As shown in FIG. 7, a laser diode 21 as a light source is contained within a photomagnetic signal detecting apparatus 10. A diffused light, for example, of a P polarized light emitted from this laser diode 21 is made a parallel light beam by a collimator lens 22. This parallel light beam enters obliquely a prism 23. This light beam enters a beam splitter 24, a part of it is reflected and the rest is transmitted, then has the light path converted by a total reflecting mirror 26 to be in the direction at right angles (to this side of the paper surface in FIG. 7) and is then condensed and radiated by an objective 28 onto a recording medium not illustrated.

The above mentioned reflected light by the beam splitter 24 is made by a lens 25 to enter an auto-power controlled (APC) photodetector 30. The incident light is reflected by this beam splitter 24 and is further reflected by the entrance surface of a prism 29 to enter a lens 31.

A part of the reflected light enters the above mentioned prism 29, has the light path changed by 90 degrees and is emitted onto a critical angle prism 32 through which the light beam can enter a 4-divided photodetector 35 for focusing.

The light beam reflected by the above mentioned prism 29 is made a parallel light by lenses 31 and 33 and enters a polarizing beam splitter (which shall be abbreviated as a PBS hereinafter) 7. This PBS 7 is so provided as to incline the polarization axis of the incident light by 45 degrees.

The above mentioned PBS 7 is formed of a trigonal prism having a right triangle as a cross-section and a quadrilateral prism having a parallelogram as a cross-section both made of such optical medium as, for example, glass and forming a dielectric film 14 on the surfaces in contact with each other so as to be integral. The P polarized light of the light entering the PBS 7 passes all through the dielectric film 14 and advances in the same direction as the incident light but, on the other hand, the S polarized light is reflected by the dielectric film 14 and then reaches a reflecting surface 15 having an angle, for example, of 45 degrees with the incident light and formed of an optical medium 13b. Now, if the refractive index n of the optical medium 13b is n=1.5, as the angle all of incidence upon the reflecting surface 15 is larger than the critical angle, the light will be reflected to obtain a reflected light in a position in the same direction as the incident light and parallelly shifted by a distance a.

For example, a two-divided photodiode 8 is arranged in the light paths of the transmitted light and reflected light by the above mentioned PBS 7 to convert the transmitted light and reflected light to electric signals. The two-divided photodiode 8 is electrically connected to a differential amplifier not illustrated so that the intensities of the transmitted light and reflected light may be extracted as electric signals.

The above mentioned lenses 31 and 33, PBS 7 and two-divided photodiode 8 are contained in a lens frame 41 as a holding member shown in FIG. 8.

The above mentioned lens frame 41 is columnarly formed of a rigid material and is provided with a flange part 42 in the rear end part. A light guide path 43 coinciding with the rotary axis of this lens frame 41 is provided within this lens frame 41. The above mentioned lens 31 is fixed on the entrance end side (front end side) of this light guide path 43. Further, the above mentioned lens 33 is fixed near the middle part. A groove part 44 reaching the above mentioned light guide path 43 is provided on the flange part 42 and near the front end side of the flange part 42 on the outer peripheral surface of the lens frame 41. The PBS 7 is inserted in this groove part 44 so that the light beam made a parallel light by the above mentioned lenses 31 and 33 may be incident upon the front end surface and the P polarized light and S polarized light may be emitted on the rear end surface side.

In the rear of the above mentioned PBS 7, the above mentioned two-divided photodiode 8 is provided to have its rear end surface substantially coincide with the rear end surface of the lens frame 41 and can receive the above mentioned P polarized light and S polarized light. Further, a substrate 46 is fitted to the rear end surfaces of the above mentioned two-divided photodiode 8 and lens frame 41 so as to press in the two-divided photodiode 8.

In FIG. 9, the lenses 31 and 33 are fixed within the light guide path 43 of the lens frame 41 machined with a high dimensional precision and the PBS 7 is inserted and fixed in the groove part 44 in incorporating the respective components in the above mentioned lens frame 41. In such a case, as the groove part 44 and light guide path 43 are kept in a high dimensional precision by machining, the optical axis will not deviate.

Then, the two-divided photodiode 8 is fitted in the rear of the PBS 7 and further the substrate 46 is fitted to the rear end surface of the lens frame 41.

The lens frame 41 in which the above mentioned respective optical parts are incorporated is inserted in a casing, not illustrated, of the photomagnetic signal detecting apparatus 10.

The operation of the photomagnetic signal detecting apparatus formed as in the above shall be explained.

The P polarized light emitted from the laser diode 21 is radiated onto the recording medium through the collimator lens 22, prism 23, beam splitter 24, all reflecting mirror 26 and objective 28.

The reflected light by the above mentioned recording medium is subjected to a Kerr rotation $\theta k$ or $-\theta k$ depending on whether the magnification of the recording medium is upward or downward so as to be a light vector $P_1$ or $P_2$ having an S component as in FIG. 15.

The above mentioned reflected light passes again through the objective 28 and enters the beam splitter 24. The incident light from the recording medium has the light path converted by the beam splitter 24 and is emitted onto the lens 31 provided within the lens frame 41. The incident light is made a parallel light beam by the lenses 31 and 33 and is emitted onto the PBS 7 which is provided with the main axis rotated by 45 degrees. As a result, the polarized light ($P_1$ or $P_2$) is incident as rotated by 45 degrees (by $45°+\theta k$ or $45°\ \theta k$ from the original P polarization plane) as shown in FIG. 16.

As in FIG. 17, the transmitted light through the PBS 7 becomes only a P component ($P_{1P}$ or $P_{2P}$) and the reflected light becomes only an S component ($P_{1S}$ or $P_{2S}$). These polarized lights are received by the two-divided photodiode 8 and are converted to electric signals. By a differential amplifier, not illustrated, connected with the two divided photodiode 8, the difference in the intensity between the above mentioned electric signals is taken, $P_1$ and $P_2$ are discriminated and thereby an information signal is extracted.

In case the main axis of the PBS with the incident light polarization plane is not 45 degrees, the light amounts of the reflected light and transmitted light will not be substantially equal and thereby the S/N will not be able to be made high. In this case, the main axis of the PBS 7 is adjusted. However, as the PBS 7 is provided together with the lenses 31 and 33 and two-divided photodiode 8 within the lens frame 41, the polarization plane with the incident light may be adjusted by rotating the lens frame 41. The optical axis will not deviate as compared with the case of adjusting the angle of only the PBS 7.

Also, as the precision of the reading optical system is substantially determined by the working precision of the lens frame 41, the precision of the lens frame 41 alone can be easily attained and the assembling is easy.

Further, as the incident light upon the lens frame 41 is a parallel light, even in case the lens frame 41 has an error with the optical axis, there will be no influence.

In this embodiment, in the PBS 7, the emitting directions of the P polarized light and S polarized light are parallel but may be at right angles or in any other angle.

FIGS. 10 to 13 show the sixth embodiment of the present invention.

In this embodiment, the present invention is applied to a polarization plane adjusting device.

Figure 10:
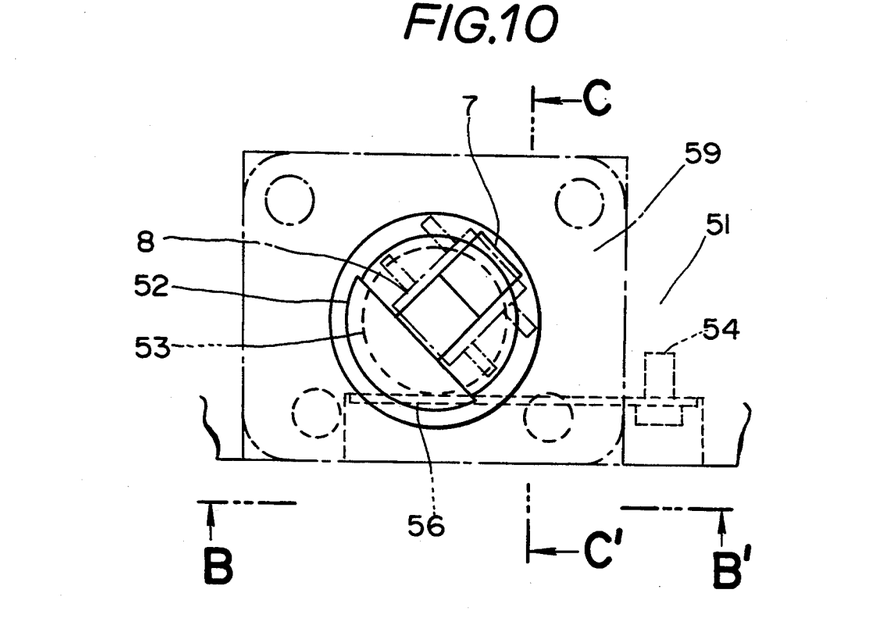
FIG. 10 is an elevation view of a polarization plane adjusting device.
Figure 11:
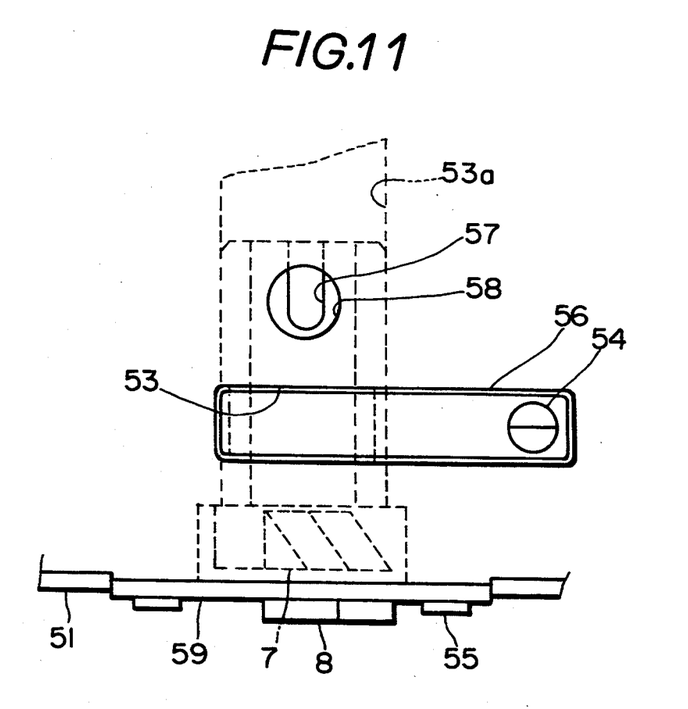
FIG. 11 is a bottom view as seen in the direction of the arrow B—B' in FIG. 10.
Figure 12:
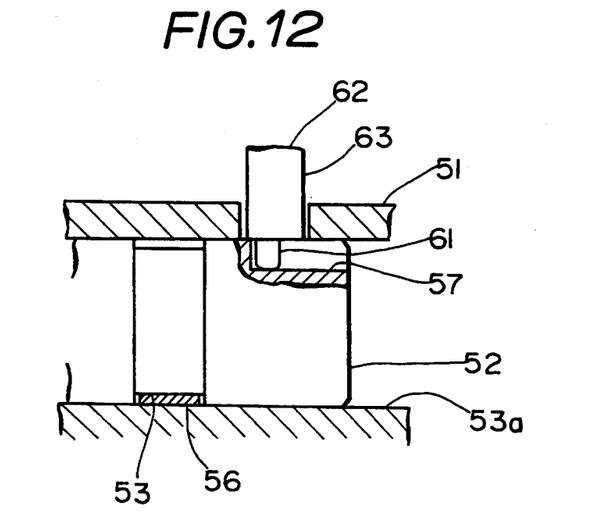
FIG. 12 is a side view as seen in the direction of the arrow C—C' in FIG. 10.
Figure 13:
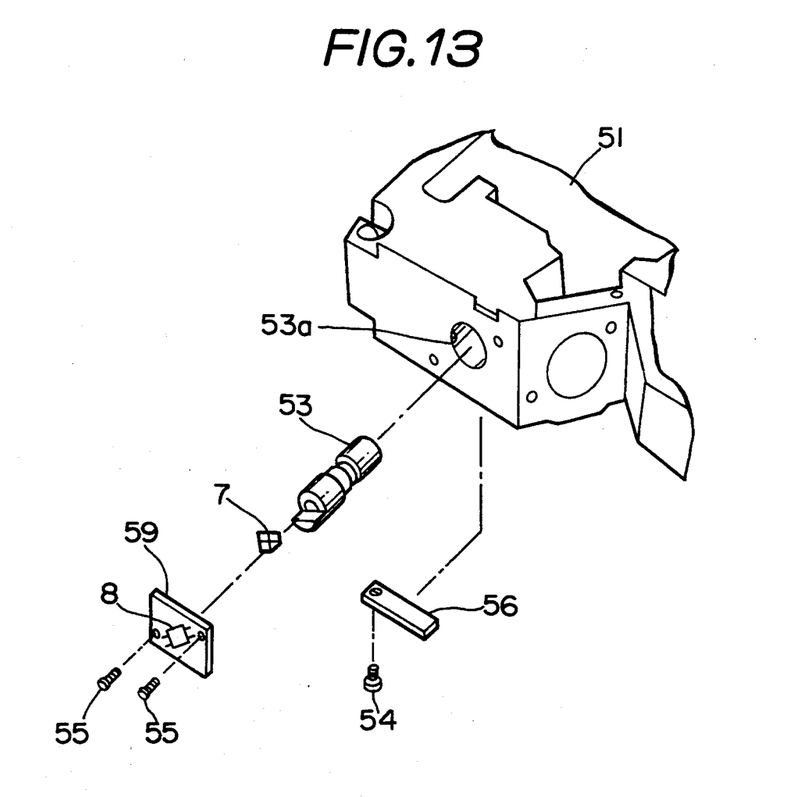
FIG. 13 is a disassembled perspective view of a polarization plane adjusting device.

The reflected light emitted from the laser light source 1 and reflected by the recording medium surface 5 is led to a lens frame 52 as a holding member having the PBS 7 and built in a carriage body 51. This lens frame 52 is substantially cylindrical. The PBS 7 and a condenser lens system, not illustrated, are provided so that the optical axis may coincide with the rotary axis of this lens frame 52. This condenser lens, not illustrated, the reflected light from the recording medium surface 5 is condensed and is made to enter the PBS 7. With the light beam having entered the PBS 7, a reflected light is obtained in a position parallelly shifted by a distance a with respect to the transmitted light as described in the first embodiment. These reflected light and transmitted light are to enter the respective light receiving surfaces of the two-divided photodiode 8 provided on a lid 59 fixed with screws 55 to the carriage body 51 on the exit end side of the lens frame 52.

The above mentioned lens frame 52 is fitted in a lens frame inserting hole 53a provided in the above mentioned carriage body 51 so as to be rotatable with respect to the optical axis of the light beam entering the lens frame 52. Further, a peripheral groove part 53 is formed in the peripheral direction near the middle part on the outer peripheral surface of the lens frame 52. A plate spring 56 having a width slightly smaller than the groove width, fixed with a screw 54 at one end to the carriage body 51 and pressing the above mentioned groove part 53 at the other end is provided in the groove part 53. By the plate spring 56 pressing the lens frame 52, a backlash produced between the lens frame inserting hole 53a and lens frame 52 can be removed. Also, a slot part 57 is provided in the optical axial direction on the outer peripheral surface on the entrance end side of the lens frame 52. An adjusting hole 58 having an inside diameter larger than the slot width of the slot part 57 is provided in the carriage body 51 opposed to the slot part 57.

Now, the reflected light from the recording medium surface 5 enters the PBS 7 through the condenser lens system. This incident light beam is divided by the PBS 7 into a transmitted light and a reflected light which enter the respective light receiving surfaces of the photodiode 8. The lens frame 52 is provided in the carriage body 51 as held in advance at an angle of 45 degrees with the polarization plane of the reflected light from the recording medium surface 5 to make the light amounts of the transmitted light and reflected light by the PBS 7 equal to each other. In case the angle of the lens frame 52 is displaced with respect to the polarization plane of the incident light, the angle of the lens frame 52 must be adjusted with a driver 62 having an eccentric pin 61 at the tip. This driver 62 is formed of an elongate shaft part 63 in the front part and a thick gripping part (not shown) in the rear part of this shaft part 63. The above mentioned thin eccentric pin 61 eccentric from the lengthwise axis of the shaft part 63 and having an outside diameter slightly smaller than the slot width of the above mentioned slot part 57 is provided to project on the tip part of this shaft part 63. The driver 62 is inserted into the adjusting hole 58 and the eccentric pin 61 is inserted into the slot part 57. When the driver 62 is rotated, the eccentric pin 61 will move with the lengthwise axis of the driver 62 as a rotary center and will press the slot part 57 to rotate the holder 52 with respect to the optical axis. This rotation is made in response to the output signal of the two-divided photodiode 8. When the holder 52 is set in a desired position, the driver 62 will be removed. Since the lens frame 52 is pressed by the plate spring 56, the angle of the lens frame 52 will be held in the position of removing the driver 62.

According to this embodiment, as the PBS 7 and two-divided photodiode 8 are made integral by the lens frame 52, the angle of the polarization plane of the incident light can be easily adjusted by rotating only the lens frame 52 without separately adjusting the PBS 7 and two-divided photodiode 8.

Also, the angle can be simply adjusted by using the driver 62 having the eccentric pin 61.

As explained above, according to the present invention, the reflected light and transmitted light by the PBS can be made substantially parallel light beams separated by any distance from each other. Therefore, the two photodiodes which have been heretofore required can be replaced with one two-divided photodiode, therefore the number of parts can be decreased and the formation and contour of the optical system can be simplified.

Also, by rotating the PBS by 45 degrees, the same effect as in the case of using a $\frac{1}{2}$-wavelength plate is obtained, therefore, the $\frac{1}{2}$-wavelength plate need not be used, the precision of the adjustment of the polarization plane is elevated, the formation and contour of the optical system can be made small and the cost can be greatly reduced.

Further, the angle of the polarization plane of the light beam can be easily adjusted and the assemblability and precision can be elevated.

What is claimed is:

1. A photomagnetic signal detecting apparatus comprising:

a light generating means for emitting a light beam; and one holding member having an optical axis in a reflected light path of said light beam reflected from a recording medium in which information is magnetically recorded, said light beam, reflected from said recording medium, entering said one holding member along a predetermined direction; said one holding member holding an optical element, said optical element having a light beam dividing means provided within said one holding member, said light beam dividing means for transmitting one of two polarization light components of said light beam reflected from said recording medium which intersect at right angles with each other and said light beam dividing means for reflecting the other of the two polarization components of the reflected light, such that the transmitted one of two polarization light components of the reflected light is emitted from said light path dividing means in a direction parallel to said predetermined direction of the light entering said one holding member, and, a light path converting means for emitting, by reflection, the light beam reflected by said light beam dividing means, in substantially a same direction as transmitted light transmitted through said light beam dividing means, and a photodetecting means for receiving the transmitted and reflected light from said optical element, wherein said holding member includes means which can permit rotation of said holding member with respect to said optical axis.

2. A photomagnetic signal detecting apparatus according to claim 1, wherein said holding member is in a position which is at an angle of 45 degrees to a plane of polarization of said light beam reflected from said recording medium which is incident on said optical element.

3. A photomagnetic signal detecting apparatus according to claim 1 wherein said holding member is regulated in a position where the main axis of said light beam dividing means is rotated by 45 degrees with respect to the polarization plane of the incident light.

4. A photomagnetic signal detecting apparatus comprising:

a light generating means for emitting a light beam; and a holding member having an optical axis in a reflected light path of said light beam reflected from a recording medium in which information is magnetically recorded; said holding member holding an optical element, said optical element having a light beam dividing means provided within the holding member, said light beam dividing means for transmitting one of two polarization light components of said light beam reflected from said recording medium which intersect at right angles with each other and said light beam dividing means for reflecting the other of the two polarization components of the reflected light, and, a light path converting means for emitting, by reflection, the light beam reflected by said light beam dividing means, in substantially a same direction as transmitted light transmitted through said light beam dividing means, and a photodetecting means for receiving the transmitted and reflected light from said optical element;

wherein said holding member is formed to be substantially cylindrical and an energizing member which can regulate the rotation of said holding member is provided.

5. A photomagnetic signal detecting apparatus comprising:

a light generating means for emitting a light beam; and a holding member having an optical axis in a reflected light path of said light beam reflected from a recording medium in which information is magnetically recorded; said holding member rotatably holding an optical element, said optical element having a light beam dividing means provided within the holding member, said light beam dividing means for transmitting one of two polarization light components of said light beam reflected from said recording medium which intersect at right angles with each other and said light beam dividing means for reflecting the other of the two polarization components of the reflected light, and, a light path converting means for emitting, by reflection, the light beam reflected by said light beam dividing means, in substantially a same direction as transmitted light transmitted through said light beam dividing means, and a photodetecting means for receiving the transmitted and reflected light from said optical element;

wherein said holding member has an engaging part which can engage with a projection eccentric from a center of rotation of said holding member.

6. A photomagnetic signal detecting apparatus comprising:

a light generating means for emitting a light beam; and a holding member having an optical axis in a reflected light path of said light beam reflected from a recording medium in which information is magnetically recorded; said holding member holding an optical element, said optical element having a light beam dividing means provided within the holding member, said light beam dividing means for transmitting one of two polarization light components of said light beam reflected from said recording medium which intersect at right angles with each other and said light beam dividing means for reflecting the other of the two polarization components of the reflected light, and, a light path converting means for emitting, by reflection, the light beam reflected by said light beam dividing means, in substantially a same direction as transmitted light transmitted through said light beam dividing means, and a photodetecting means for receiving the transmitted and reflected light from said optical element;

wherein the photodetecting means consists of two parts respectively receiving light from the light beam dividing means and the light path converting means; and wherein the position of the photodetecting means is oriented such that a quantity of incident light entering into each of said two parts is substantially equal, and wherein said holding member includes means which can permit rotation of said holding member with respect to said optical axis.

7. A method of regulating a position of an optical element in a photomagnetic signal detecting apparatus, comprising the steps of:

providing a light generating means for producing a light beam, and directing the light beam onto a recording medium in which the information is magnetically recorded;

providing an optical element, held by one holding member, having an optical axis in a reflected light path of said light beam reflected from the recording medium, wherein said one holding member includes means which can permit rotation of said holding member about said optical axis;

directing said light beam, reflected from said recording medium, to enter said optical element along a predetermined direction;

transmitting one of two polarization light components of a reflected light, from said recording medium, which intersect at right angles with each other, and reflecting the other of the two polarization components of the reflected light by a light beam dividing means as part of said optical element provided within said one holding member, such that the transmitted one of the two polarization light components of the reflected light is parallel to said predetermined direction of the light entering said optical element;

emitting, by reflection, the light beam reflected by said light beam dividing means, in substantially a same direction as said polarization light component transmitted through said light beam dividing means, by a light path converting means as part of said optical element;

receiving light transmitted through said light beam dividing means and light reflected by said light path converting means by a photodetecting means; and regulating rotation of said optical element about said optical axis in a position as rotated by 45 degrees to a polarization plane of an incident light beam by rotating said one holding member.

* * * * *